United States Patent
Zhang et al.

(10) Patent No.: US 6,320,636 B2
(45) Date of Patent: Nov. 20, 2001

(54) TFT-LCD HAVING PIXEL ELECTRODE OVERLAPPING SCAN AND DATA LINES EXCEPT AT THE INTERSECTION OF LINES

(75) Inventors: Hongyong Zhang; Takeshi Fukunaga, both of Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/840,706

(22) Filed: Apr. 23, 2001

Related U.S. Application Data

(62) Division of application No. 08/822,789, filed on Mar. 24, 1997, now Pat. No. 6,222,595.

(30) Foreign Application Priority Data

Apr. 1, 1996 (JP) .................................................. 8-101855

(51) Int. Cl.⁷ ............................. F02F 1/1343; F02F 1/136
(52) U.S. Cl. ................................. 349/139; 349/44; 349/43
(58) Field of Search ............................... 349/42, 43, 139, 349/38, 39, 193, 44; 257/59

(56) References Cited

U.S. PATENT DOCUMENTS

| | | | |
|---|---|---|---|
| 5,003,356 | * 3/1991 | Wakai et al. | 349/139 |
| 5,418,635 | * 5/1995 | Mitsui et al. | 349/113 |
| 5,446,562 | * 8/1995 | Sato | 349/42 |
| 5,459,596 | * 10/1995 | Ueda et al. | 349/111 |
| 5,528,395 | * 6/1996 | So | 349/42 |
| 5,535,028 | * 7/1996 | Bae et al. | 349/42 |
| 5,659,375 | * 8/1997 | Yamashita et al. | 349/38 |
| 5,708,483 | * 1/1998 | Asai | 349/110 |
| 5,852,488 | * 12/1998 | Takemura | 349/43 |
| 5,880,797 | * 3/1999 | Yamada et al. | 349/139 |
| 5,933,208 | * 8/1999 | Kim | 349/110 |
| 5,946,058 | * 8/1999 | Kamada et al. | 349/38 |

* cited by examiner

*Primary Examiner*—William L. Sikes
*Assistant Examiner*—Toan Ton
(74) *Attorney, Agent, or Firm*—Fish & Richardson P.C.

(57) ABSTRACT

A structure is provided which avoids overlap of a pixel electrode and an intersecting portion of a gate line and a data line. For example, the pixel electrode is patterned such that its corner portion is intentionally cut out to avoid the intersecting portion. With this structure, the capacitance of a storage capacitor that is formed by an overlapping portion of the pixel electrode and a black matrix can be increased while short-circuiting in a third interlayer insulating film that is interposed between the pixel electrode and the black matrix is prevented.

6 Claims, 6 Drawing Sheets

CIRCUIT TFT   PIXEL TFT

TFT-LCD HAVING PIXEL ELECTRODE OVERLAPPING SCAN AND DATA LINES EXCEPT AT THE INTERSECTION OF LINES

This application is a divisional of Ser. No. 08/822,789 filed Mar. 24, 1997 now U.S. Pat. No. 6,222,595.

BACKGROUND OF THE INVENTION

1. Field of the Invention

The present invention relates to a liquid crystal display device in which semiconductor devices using a thin-film semiconductor having crystallinity are arranged. In particular, the invention relates to an active matrix liquid crystal display device.

2. Description of the Related Art

In recent years, technologies for forming thin-film transistors (TFTs) on an inexpensive glass substrate have developed at high speed. This is due to increase in demand for the active matrix liquid crystal display device in which integrated circuits are formed on the same substrate.

In the active matrix liquid crystal display device, hundreds of thousands or more of pixels arranged in matrix form are respectively provided with thin-film transistors and charge entering/exiting from each pixel electrode is controlled by the switching function of the thin-film transistor.

The active matrix liquid crystal display device has a feature that integrated circuits are formed in which the thin-film transistors arranged in matrix form in the pixel area (i.e., pixel TFTs) are driven by driver circuit thin-film transistors (i.e., driver TFTs) that are provided around the pixel area.

However, to allow the active matrix liquid crystal display device to function properly, it is necessary that all the thin-film transistors in the pixel area operate normally. This is a factor of greatly reducing the yield of a manufacturing process of the active matrix liquid crystal display device.

Among causes of display defects in the pixel area are an operation failure of a pixel TFT and short-circuiting between wiring lines. In particular, the problem of short-circuiting between wiring lines should be solved thoroughly because it may cause a point defect or a line defect.

Among various types of electrodes and wiring lines provided in the active matrix liquid crystal display device are a gate line, a data line, a capacitor line, a black matrix, and a pixel electrode. These electrodes and wiring lines are made of conductive materials and insulated from each other by an interlayer insulating film.

However, for example, in a step portion where the coverage of an interlayer insulating film is poor, there may occur a case that sufficient insulation performance is not obtained because, for instance, a current path is formed between wiring lines due to insufficient thickness of the interlayer insulating film, a crack in the interlayer insulating film, or some other reason.

Process Leading to the Invention

FIGS. 1A and 1B show a general structure of an intersecting portion of a gate line and a data line and its vicinity in an active matrix liquid crystal display device in which a black matrix is formed on the same substrate as the pixel area. FIG. 1A is a sectional view taken along line A–A' in FIG. 1B.

Reference numerals 101–103 denote a glass substrate, an undercoat film, and an insulating film extending from a gate insulating film, respectively. A gate line 104 is formed on the insulating film 103, and a first interlayer insulating film 105 is so formed as to cover the gate line 104. A data line 106 is formed on the first interlayer insulating film 105.

A second interlayer insulating film 107 is so formed as to cover the data line 106, and a black matrix 108 is formed on the second interlayer insulating film 107. The black matrix 108 is covered with a third interlayer insulating film 109, and a pixel electrode 110 is formed thereon. A thin film 111 as an alignment film is formed on the pixel electrode 110.

FIG. 1B is a top view of an intersecting portion 100 of the gate line 104 and the data line 106. In FIG. 1B, the gate line 104 and the data line 106 are drawn by broken lines because they exist below the black matrix 108.

As mentioned above, the pixel electrode 110 is formed above the black matrix 108 with the third interlayer insulating film 109 interposed in between. In this structure, a capacitor is formed by the black matrix 108 and the pixel electrode 110. The present inventors utilize this capacitor as an auxiliary capacitor.

Therefore, to increase the capacitance of the auxiliary capacitor, it is desirable that the overlapping portion of the black matrix 108 and the pixel electrode 110 be as wide as possible. However, if the pixel electrode 110 is so formed as to overlap with the intersecting portion 100, the following problems will occur.

In FIG. 1A, reference numerals 112 and 113 denote spacers to determine the cell gap of the liquid crystal display device. The spacers 112 and 113 are interposed between and pressed by the active matrix substrate (which means the glass substrate 101 and the device structure formed thereon collectively) and an opposed substrate 114.

The spacers 112 and 113 are arranged at a certain density on the surface of the active matrix substrate (or the opposed substrate). For example, in the case of a small liquid crystal display device having a diagonal size of about 3 inches, they may be distributed at a density of several tens of pieces per square centimeters. However, as the size of the liquid crystal display device increases, the density needs to be increased in a range of several tens to several hundreds of pieces per square centimeters.

Since the spacers exist at a given density in the pixel area of the active matrix display device, a spacer may be located at the intersecting portion 100 of the gate line 104 and the data line 106 at a certain probability.

In this case, since the intersecting portion 100 of the gate line 104 and the data line 106 considerably protrudes from the flat portion, the spacer 112 placed thereon receives much stronger pressure than the spacer 113 which is placed on the flat portion.

The strong pressure exerted on the spacer 112 in turn imposes a heavy load on the underlying laminate structure, to possibly cause break-off portions 115 such as a crack in the third interlayer insulating film 109. As a result, a current path is formed between the black matrix 108 and the pixel electrode 110, so that they no longer has the function of forming an auxiliary capacitor. This may causes an image display defect.

It is easily understood that the above defect is caused by the structure in which the pixel electrode 110 is laid on the highest portion of the step as shown in FIG. 1A, and hence the problem can be solved by avoiding such a structure.

On the other hand, to increase the capacitance of the auxiliary capacitor, it is necessary to make the overlapping portion of the black matrix 108 and the pixel electrode 110 as wide as possible. In the above circumstances, the inventors thought that it would be proper to provide a structure shown in FIG. 2A.

FIG. 2A is a top view corresponding to FIG. 1B. FIG. 2A therefore uses the same reference numerals as FIG. 1B.

In this structure, the pixel electrode 110 does not overlap with the gate line 104 nor the data line 106. That is, the pixel electrode 110 is not laid on the highest portion of the intersecting portion 100, so that there should not be formed any current path between the black matrix 108 and the pixel electrode 110 due to the above-mentioned pressure exerted from a spacer.

Actually, however, there may occur a case that the pixel electrode 110 is laid on the highest portion of the intersecting portion 100 due to a patterning error, i.e., insufficient patterning accuracy, as shown in FIG. 2B.

In this state, defective portions 115 may occur in the third interlayer insulating film 109 due to the above-mentioned pressure from a spacer, disabling the black matrix 108 and the pixel electrode 110 to form an auxiliary capacitor.

Although the safest measure is to form the pixel electrode 110 with a large margin in light of the patterning accuracy, the increase in margin is not desirable in view of a future situation where it will become difficult to secure necessary capacitance of the auxiliary capacitor as the miniaturization of wiring lines proceeds.

SUMMARY OF THE INVENTION

An object of the present invention is to provide, by solving the above problems, a technique for forming a defect-free auxiliary capacitor while securing a sufficient area for it. More specifically, an object of the invention is to provide a technique for preventing short-circuiting of an interlayer insulating film due to pressure exerted from a spacer.

According to one aspect of the invention, there is provided a liquid crystal display device comprising an active matrix substrate comprising a gate line formed on a substrate having an insulating surface; a first interlayer insulating film covering the gate line; a data line formed on the first interlayer insulating film so as to cross the gate line; a thin-film transistor formed in the vicinity of an intersecting portion of the gate line and the data line; a second interlayer insulating film; a black matrix made of a conductive material and formed over the gate line and the data line with the second interlayer insulating film interposed in between; a third interlayer insulating film covering the black matrix; a pixel electrode being a transparent conductive film and formed on the third interlayer insulating film, the pixel electrode coextending with the gate line and the data line in areas other than the intersecting portion of the gate line and the data line with the interlayer insulating films interposed in between; an opposed substrate having electrodes on a surface thereof; and spacers and a liquid crystal interposed between the active matrix substrate and the opposed substrate.

Further, there is provided a liquid crystal display device comprising an active matrix substrate comprising a gate line formed on a substrate having an insulating surface; a first interlayer insulating film covering the gate line; a data line formed on the first interlayer insulating film so as to cross the gate line; a thin-film transistor formed in the vicinity of an intersecting portion of the gate line and the data line; a second interlayer insulating film; a pixel electrode being a transparent conductive film and formed over the gate line and the data line with the second interlayer insulating film interposed in between, the pixel electrode coextending with the gate line and the data line in areas other than the intersecting portion of the gate line and the data line with the interlayer insulating films interposed in between; a third interlayer insulating film covering the pixel electrode; a black matrix made of a conductive material and formed on the third interlayer insulating film; an opposed substrate having electrodes on a surface thereof; and spacers and a liquid crystal interposed between the active matrix substrate and the opposed substrate.

In the above liquid crystal display devices, the black matrix, the pixel electrode, and the third interlayer insulating film form an auxiliary capacitor.

A corner portion of the pixel electrode is intentionally cut out so as not to coextend with the intersecting portion of the gate line and the data line when viewed from above.

The above devices will be described with reference to FIGS. 3A and 3B. FIG. 3A is a sectional view of an intersecting portion 100 of a gate line 104 and a data line 106 and its vicinity in a pixel area. FIG. 3A uses the same reference numerals as FIG. 1A with non-essential parts not given reference numerals, because they show similar structures.

The structure of FIG. 3A is different from that of FIG. 1A in that a pixel electrode 110 does not overlap with the intersecting portion 100. This structure prevents short-circuiting in an auxiliary capacitor due to pressure exerted from a spacer, which is the problem described in the above background description.

FIG. 3B shows a top view of the same structure. That is, FIG. 3A is a sectional view taken along a chain line B–B' in FIG. 3B.

As shown in FIG. 3B, end portions of the pixel electrode 110 coextend with the gate line 104 and the data line 106. On the other hand, a corner portion of the pixel electrode 110 is intentionally cut out to avoid the intersecting portion 100.

There is another advantage that because the pattern of the pixel electrode 110 no longer has sharp corner portions, an orientation film (alignment film) which will be later formed so as to cover the pixel electrode 110 has superior coverage.

According to another aspect of the invention, there is provided a manufacturing method of a liquid crystal display device, comprising the steps of forming gate lines made of a conductive material on a substrate having an insulating surface; forming a first interlayer insulating film so as to cover the gate lines; forming data lines on the first interlayer insulating film so that they cross the gate lines; forming a second interlayer insulating film so as to cover the gate lines and the data lines; forming a black matrix made of a conductive material on the second interlayer insulating film; forming a third interlayer insulating film so as to cover the black matrix; forming transparent conductive films as pixel electrodes on the third interlayer insulating film so that the pixel electrodes coextend with the gate lines and the data lines in areas other than the intersecting portions of the gate lines and the data lines with the interlayer insulating films interposed in between; inserting spacers and sealing a liquid crystal between the substrate and an opposed substrate having electrodes on a surface thereof; and forming thin-film transistors in the vicinity of the respective intersecting portions of the gate lines and the data lines that are arranged in matrix form.

Further, there is provided a manufacturing method of a liquid crystal display device, comprising the steps of forming gate lines made of a conductive material on a substrate having an insulating surface; forming a first interlayer insulating film so as to cover the gate lines; forming data lines on the first interlayer insulating film so that they cross the gate lines; forming a second interlayer insulating film so as to cover the gate lines and the data lines; forming transparent conductive films as pixel electrodes on the second interlayer insulating film so that the pixel electrodes coextend with the gate lines and the data lines in areas other than the intersecting portions of the gate lines and the data lines with the interlayer insulating films interposed in between; forming a third interlayer insulating film so as to cover the pixel electrodes; forming a black matrix made of a conductive material on the third interlayer insulating film; inserting spacers and sealing a liquid crystal between the substrate and an opposed substrate having electrodes on a surface thereof; and forming thin-film transistors in the vicinity of the respective intersecting portions of the gate lines and the data lines that are arranged in matrix form.

DETAILED DESCRIPTION OF THE PREFERRED EMBODIMENTS

Figure 1A:
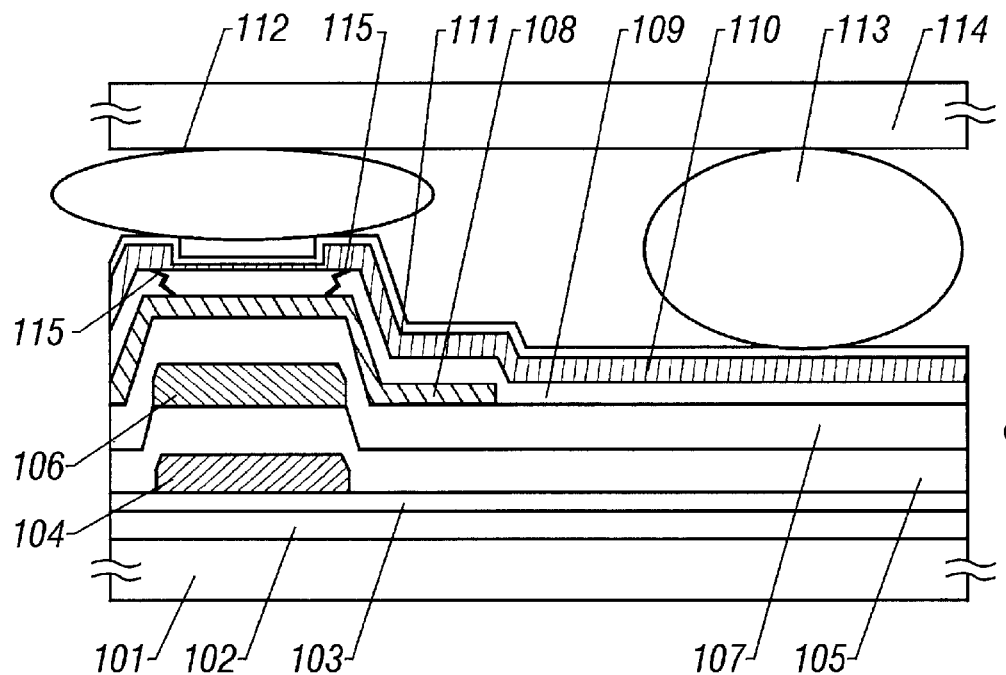
FIGS. 1A and 1B show a conventional structure of an intersecting portion of a gate line and a data line and its vicinity.

The present invention as summarized above will be described below in detail by way of embodiments.
Embodiment 1

This embodiment is directed to a process of manufacturing an active matrix liquid crystal display device having thin-film transistors (TFTs). A manufacturing process of a pixel TFT to be formed in a pixel area and a circuit TFT to be formed in a peripheral driver circuit will be outlined with reference to FIGS. 4A–4E.

First, a substrate having an insulating surface is prepared. "Substrates having an insulating surface" not only means a glass substrate, a quartz substrate, and a substrate made of these material on which an insulating film is formed, but also encompasses a silicon substrate and a conductive substrate on which an insulating film is formed.

In this embodiment, a 2,000-Å-thick silicon oxide film as an undercoat film 402 is formed on a glass substrate 401 by sputtering or plasma CVD.

Next, an amorphous silicon film (not shown) of 100–1,000 Å in thickness is formed on the undercoat film 402 by plasma CVD or low-pressure thermal CVD. The amorphous silicon film is crystallized by performing a heat treatment at 550°–650° C. for 1–24 hours or illumination with laser light in an ultraviolet range, or both. In this step, an element (for instance, Ni) for accelerating the crystallization may be added.

Next, a crystalline silicon film obtained by crystallizing the amorphous silicon film is patterned into island-like semiconductor layers as active layers 403 and 404.

A 1,200-Å-thick silicon oxide film 405, which will serve as a gate insulating film, is formed over the active layers 403 and 404 by plasma CVD. Alternatively, a silicon oxynitride (for instance, represented by $SiO_xN_y$) film or a silicon nitride film may be used.

Next, a 3,000-Å-thick aluminum film 406 containing scandium at 0.2 wt % is formed. The addition of scandium is effective in suppressing occurrence of hillocks and whiskers on the surface of the aluminum film 406. The aluminum film 406 will serve as a gate electrode.

Instead of the aluminum film 406, a film made of some other metal material such as Mo, Ti, Ta, or Cr, or a conductive film made of polysilicon or a silicide material may be used.

Next, anodization is performed in an electrolyte with the aluminum film 406 used as the anode. The electrolyte is one obtained by neutralizing (pH=6.92) an ethylene glycol solution containing tartaric acid at 3% by aqueous ammonia. Platinum is used as the cathode. The formation current and the final voltage are set at 5 mA and 10 V, respectively.

A resulting dense anodic oxide film (not shown) has an effect of improving the adhesiveness of a photoresist which will be formed later. Its thickness can be controlled by the voltage application time (see FIG. 4A).

In this state, the aluminum film 406 is patterned into starting forms of gate electrodes and gate lines (not shown). Then, second anodization is performed to form porous anodic oxide films 407 and 408 (see FIG. 4B).

A 3% oxalic acid solution is used as an electrolyte, and platinum is used as the cathode. The formation current and the final voltage are set at 2–3 mA and 8 V, respectively. This anodization proceeds parallel with the substrate 401. The length of the porous anodic oxide films 407 and 408 can be controlled by the voltage application time.

After the photoresist is removed with a dedicated peeling liquid, third anodization is performed by using an electrolyte obtained by neutralizing (pH=6.92) an ethylene glycol solution containing tartaric acid at 3% with aqueous ammonia. Platinum is used as the cathode. The formation current and the final voltage is set at 5–6 mA and 100 V, respectively.

Resulting anodic oxide films 409 and 410 are very dense and strong, and hence provide an effect of protecting gate electrodes 411 and 412 from being damaged in later steps such as doping steps.

The strong anodic oxide films 409 and 410, which are hard to be etched, may cause a problem of a long etching time in forming contact holes through those films. It is therefore desirable that the thickness of those films be less than 1,000 Å.

Figure 4A:
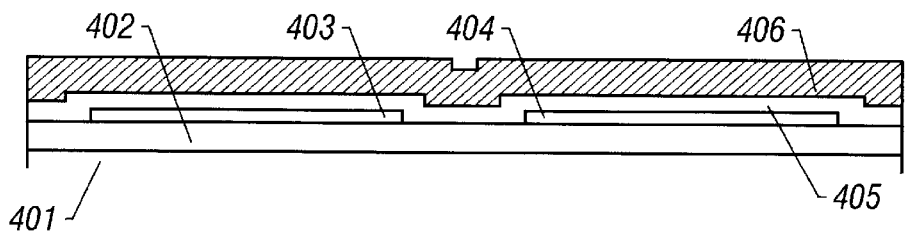
FIGS. 4A–4E show a manufacturing process of thin-film transistors according to the first embodiment.
Figure 4B:
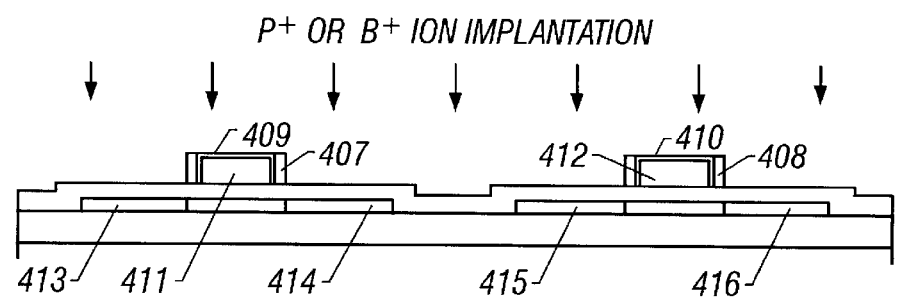

In the state of FIG. 4B, an impurity is introduced into the active layers 403 and 404 by ion doping. For example, an impurity of P (phosphorus) may be introduced to form an n-channel TFT, and an impurity of B (boron) may be introduced to form a p-channel TFT.

As a result, source and drain regions 413 and 414 of a circuit TFT and source and drain regions 415 and 416 of a pixel TFT are formed in a self-aligned manner.

Next, after the porous anodic oxide films 407 and 408 are removed, ion implantation is performed again. The dose at this time is set lower than in the previous ion implantation.

Figure 4C:
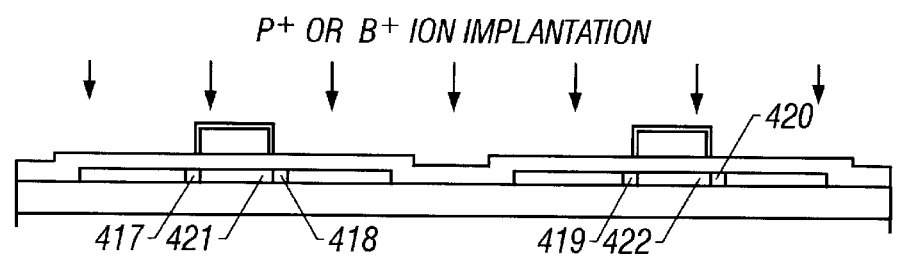

As a result, low-concentration impurity regions 417 and 418 and a channel-forming region 421 of the circuit TFT and low-concentration impurity regions 419 and 420 and a channel-forming region 422 are formed in a self-aligned manner (see FIG. 4C).

In this state, laser light illumination and thermal annealing are performed. In this embodiment, the laser light energy density is set at 160–170 $mJ/cm^2$, and the thermal annealing is performed at 300°–450° C. for one hour.

In this step, the crystallinity of the active layers 403 and 404 that were damaged in the ion doping step is improved and the implanted impurity ions are activated.

Next, a 4,000-Å-thick silicon nitride film (or a silicon oxide film) as a first interlayer insulating film 423 is formed by plasma CVD. The first interlayer insulating film 423 may have a multilayered structure.

Then, contact holes are formed, by etching, through the first interlayer insulating film 423 at locations corresponding to the source region 413, the gate electrode 411, and the drain region 414 of the circuit TFT and the source region 415 of the pixel TFT.

Subsequently, laminate films of titanium and a material mainly made of aluminum are formed as a source wiring line 424, a gate wiring line 425, and a drain wiring line 426 of the circuit TFT and a source wiring line 427 of the pixel TFT. At the same time, a data line (not shown) is formed which is connected to the source wiring line 427 of the pixel TFT.

Next, a second interlayer insulating film 428 is formed at a thickness of 0.5–5.0 µm by plasma CVD. The second interlayer insulating film 428 may be either a single-layer film or a multilayer film of a silicon oxide film, a silicon nitride film, an organic resin film, and like films.

In particular, the use of an organic resin material such as polyimide is preferable, because it has a small relative dielectric constant and can easily provide a thick film and hence capacitances of parasitic capacitors formed by the above respective wiring lines and a black matrix that will be formed later are negligible.

Figure 4D:
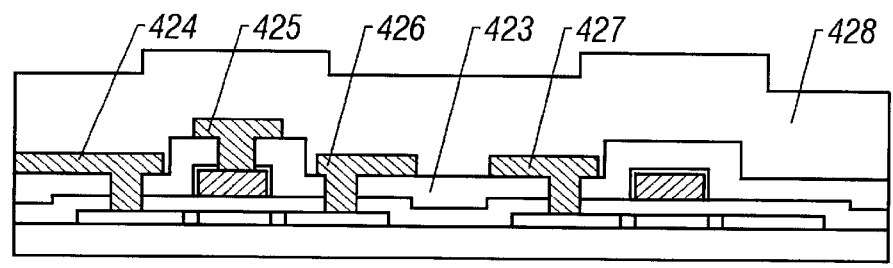

Thus, the state of FIG. 4D is obtained. In this state, a 1,000-Å-thick black matrix 429 is formed by using a conductive material. The black matrix 429 is so shaped as to cover the pixel TFT as well as the gate line and data line (both not shown).

Next, a third interlayer insulating film 430 is so formed as to cover the black matrix 429. It is preferred that the third interlayer insulating film 430 be as thin as possible and be made of a material having a large relative dielectric constant (at least larger than that of the second interlayer insulating film 428). In this embodiment, the third interlayer insulating film 430 is a 2,000-Å-thick silicon nitride film.

Figure 4E:
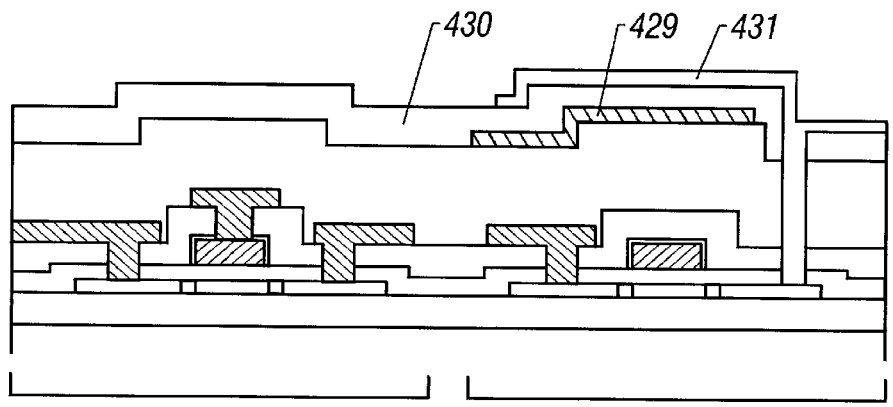

Next, contact holes are formed, by etching, through the second and third interlayer insulating films 428 and 430 at a location corresponding to the drain region 416 of the pixel TFT, and a transparent conductive film as a pixel electrode 431 is formed. Thus, the circuit TFT and the pixel TFT are formed as shown in FIG. 4E.

Further, the pixel area where the above pixel TFTs are arranged in matrix form needs to be subjected to a step for introducing and sealing a liquid crystal. This step will be outlined below.

First, in the pixel area, an orientation film (alignment film) is so formed as to cover the pixel electrodes 431. Rubbing is then performed to impart a desired alignment (i.e., orientation) characteristic to the orientation film (alignment film). Thus, the preparation of the active matrix substrate is completed.

Next, an opposed substrate formed with a transparent conductive film and an orientation film (alignment film) that is given a desired alignment characteristic (orientation characteristic) is prepared. If necessary, the opposed substrate may be provided with a black matrix or color filters.

The thus-prepared opposed substrate is bonded to the active matrix substrate. In the bonding step, spacers are interposed between the two substrate to determine the cell gap.

A sealing material is applied to the periphery of the pixel area to prevent the two substrates from disengaging from each other as well as to prevent a liquid crystal, which will be injected later, from escaping.

After the two substrates are bonded together, a liquid crystal is injected through an opening of the sealing member and then confined in the space corresponding to the pixel area. Thus, a liquid crystal display device is completed.

Figure 5:
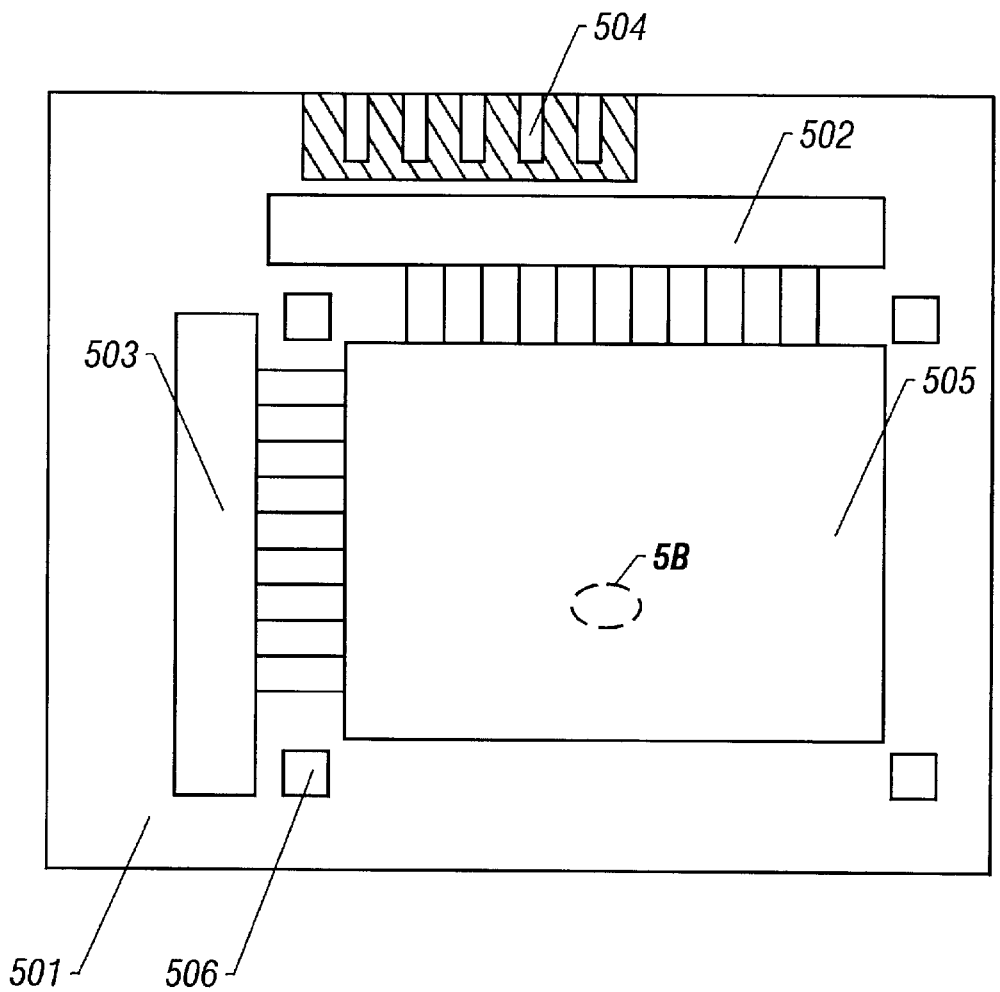
FIG. 5 shows a general configuration of a liquid crystal display device according to the first embodiment.
Figure 5B:
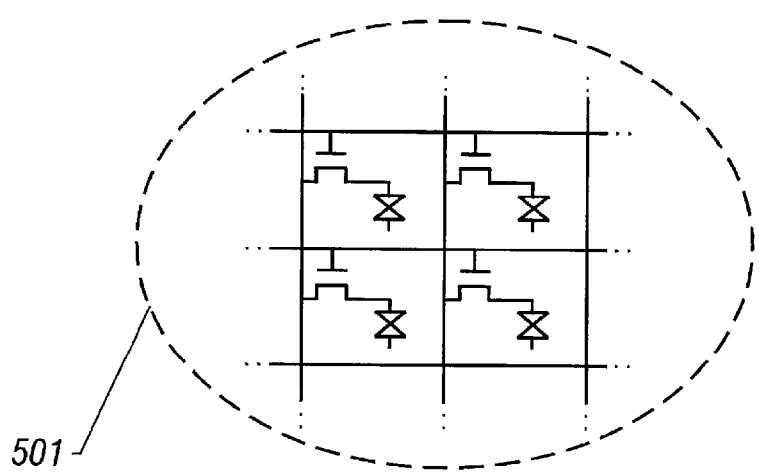

FIG. 5 shows a general configuration of an active matrix liquid crystal display device in which the above-described circuit TFTs and pixel TFTs are arranged. In FIG. 5, reference numerals 501–503 denote a glass substrate, a horizontal scanning circuit, and a vertical scanning circuit, respectively.

Image signals are externally supplied to input terminals 504, and then sent to the pixel electrodes with the pixel TFTs, which are controlled by the horizontal and vertical scanning circuits 502 and 503, serving as switching elements. Image display is performed by a pixel area 505 by varying the electro-optical characteristic of the liquid crystal that is interposed between the active matrix substrate and the opposed substrate. Reference numeral 506 denotes common electrodes for applying predetermined voltages to the opposed substrate.

The circuit TFTs described in connection with FIGS. 4A–4E can constitute the horizontal and vertical scanning circuits 502 and 503 in the form of a CMOS structure in which an n-channel TFT and a p-channel TFT are combined complementarily.

On the other hand, the pixel TFTs are disposed at the respective intersections of the gate lines and the source lines that are arranged in matrix form, as shown in an enlarged view 507. Thus, the pixel TFTs can be used as switching elements for controlling the amount of charge entering/ exiting from the respective electrodes.

The above-configured device of FIG. 5 operates in the manner as outlined above to perform image display. This device is a compact, high-performance panel in which the operation frequency of the peripheral circuits is higher than 3 MHz and the contrast ratio of the display section is higher than 100.

Figure 3A:
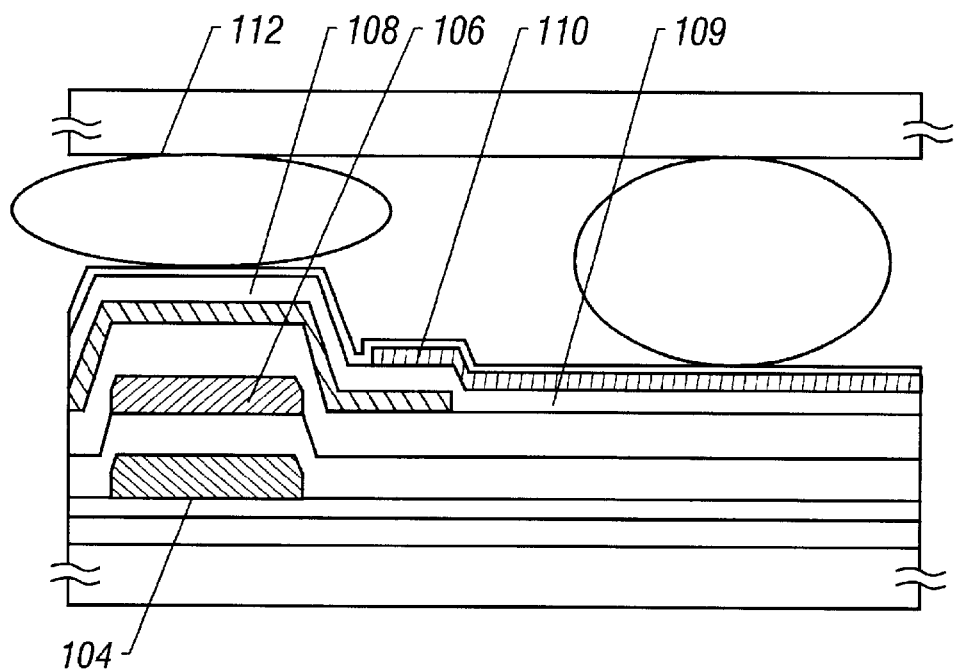
FIGS. 3A and 3B show a structure of an intersecting portion of a gate line and a data line and its vicinity according to a first embodiment of the present invention.
Figure 3B:
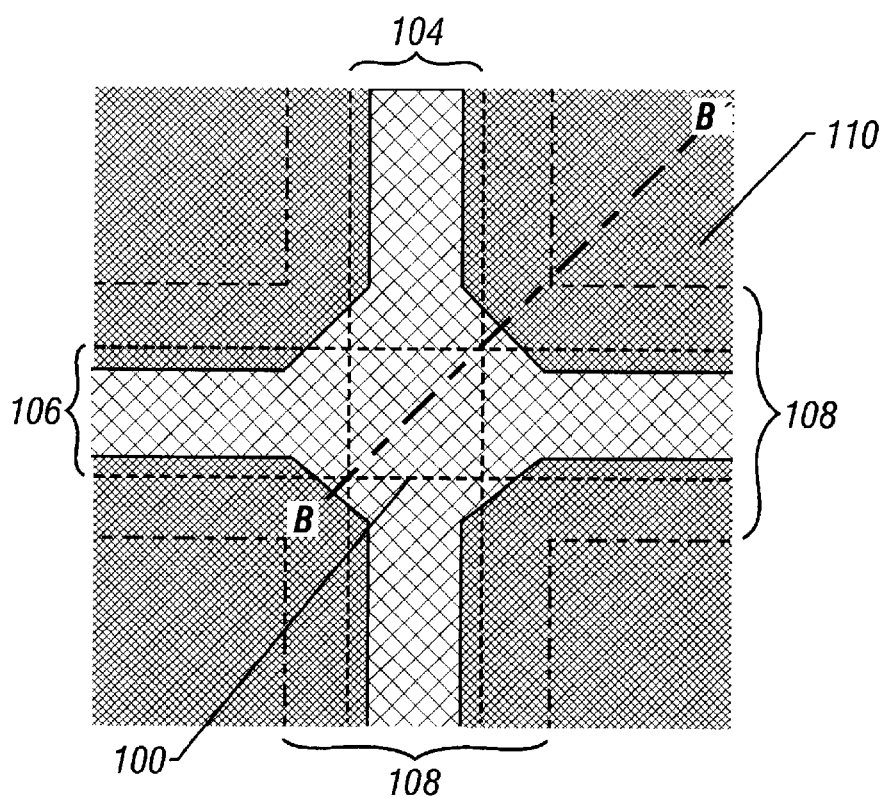

In the pixel area of the above-configured liquid crystal display device, each intersecting portion of a gate line and a data line and its vicinity assume a structure shown in FIGS. 3A and 3B. FIG. 3B is a top view and FIG. 3A is a sectional view taken along line B–B' in FIG. 3B.

Although in this embodiment a dense anodic oxide film is formed on the surface of a gate line 104, it is not shown in FIG. 3A.

With this structure, even if a spacer 112 exists over an intersecting portion 100, no defective portion occurs in a third interlayer insulating film 109 between a black matrix 108 and a pixel electrode 110.

Since the pixel electrode is so patterned as to intentionally avoid only the intersecting portion 100, it can be overlapped with the gate line 104 and the data line 106, thereby maximizing the capacitance of the auxiliary capacitor.

Even if some patterning error occurs in forming the pixel electrode 110 of FIG. 3B, there never occurs an event that the pixel electrode 110 overlaps with the intersecting portion 100. Therefore, the problem relating to the patterning accuracy which is associated with the conventional techniques can be solved.

Although a patterning margin of about several micrometers is needed in light of the current patterning accuracy, this embodiment can easily provide such a margin by virtue of the unique shape of the pixel electrode 110.

As described above, the manufacturing method of a liquid crystal display device according to this embodiment solves the problems associated with the conventional techniques, such as short-circuiting in an auxiliary capacitor or between wiring lines due to pressure that is exerted from a spacer, thereby greatly improving the yield of a manufacturing process.

Embodiment 2

This embodiment is directed to a modification of the pixel electrode of the first embodiment. Specifically, a pixel electrode 110 is formed as shown in FIG. 6.

Figure 1B:
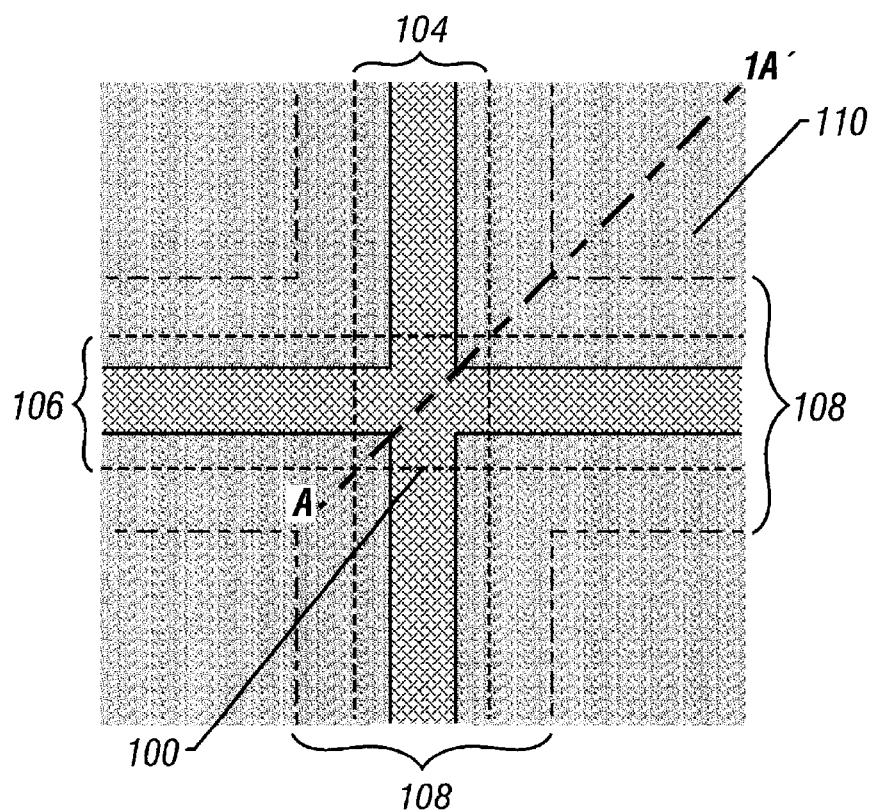
Figure 2A:
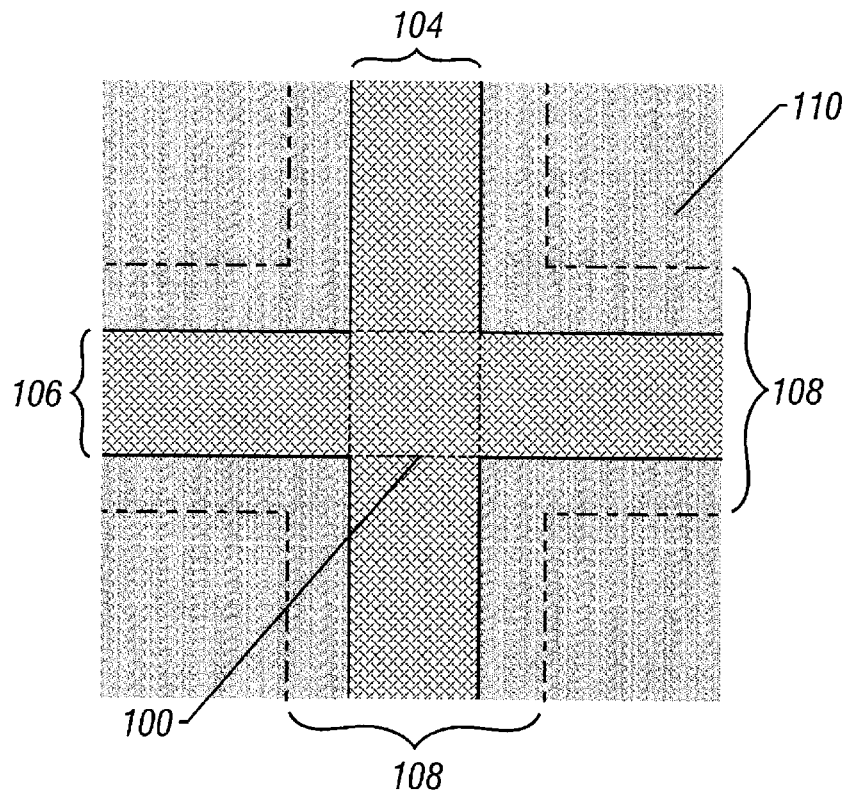
FIGS. 2A and 2B show a conceivable structure of an intersecting portion of a gate line and a data line and its vicinity.
Figure 2B:
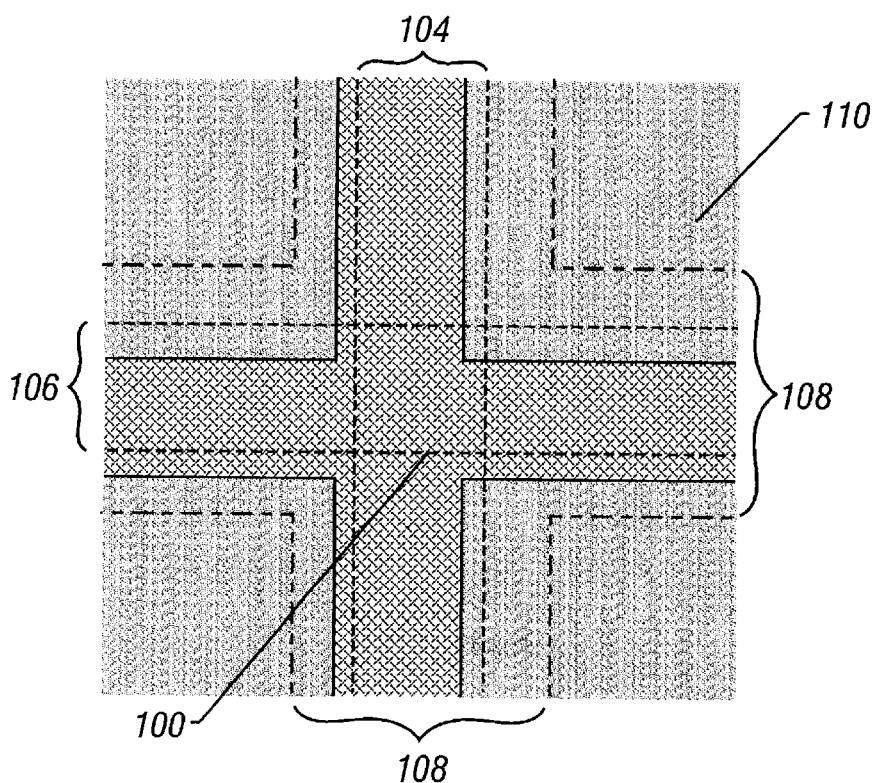
Figure 6:
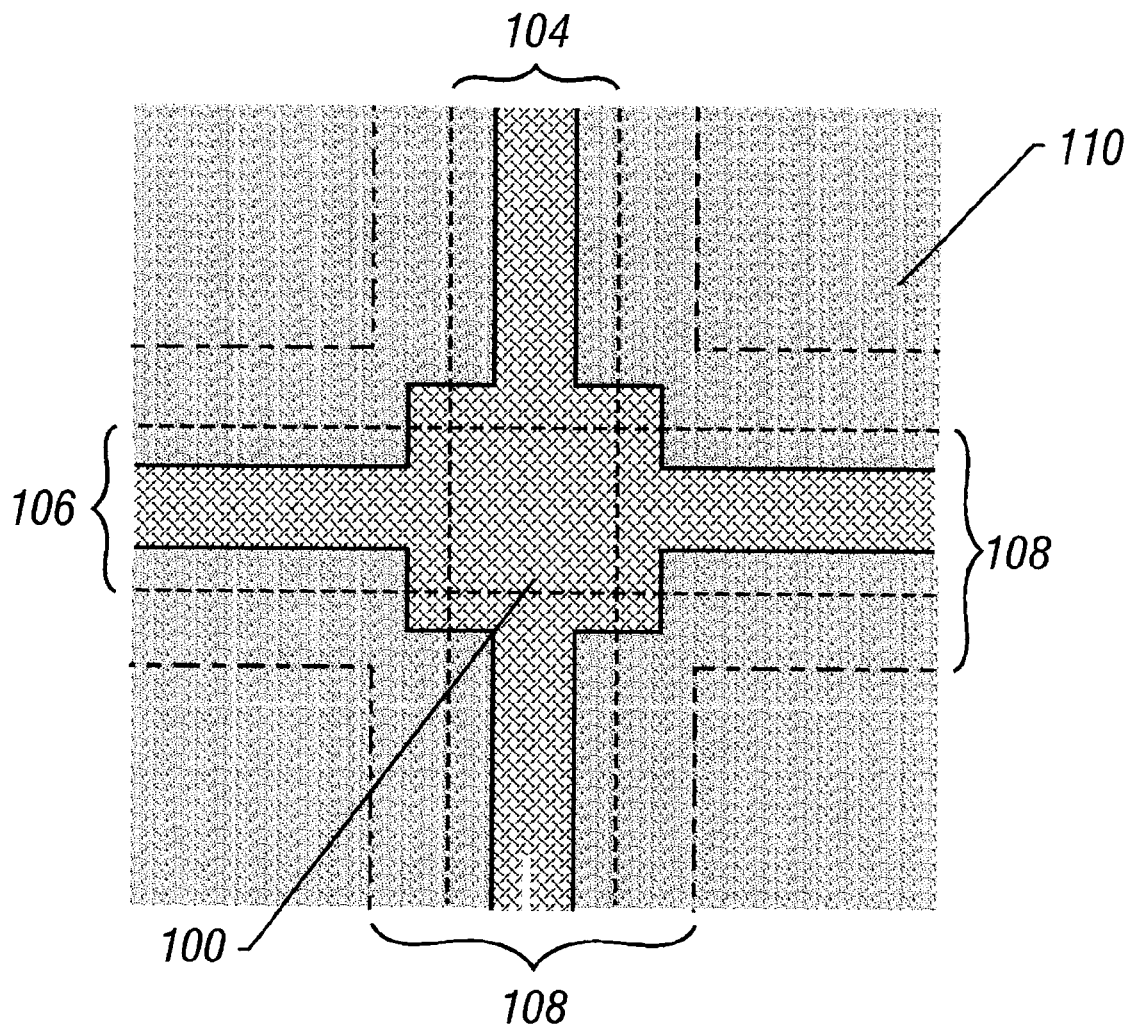
FIG. 6 shows a structure of an intersecting portion of a gate line and a data line and its vicinity according to a second embodiment of the invention.
Figure 3A:
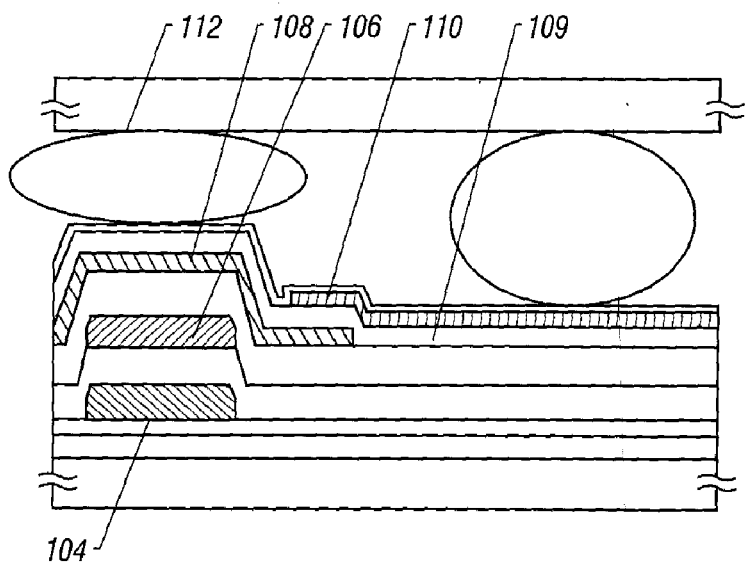
Figure 3B:
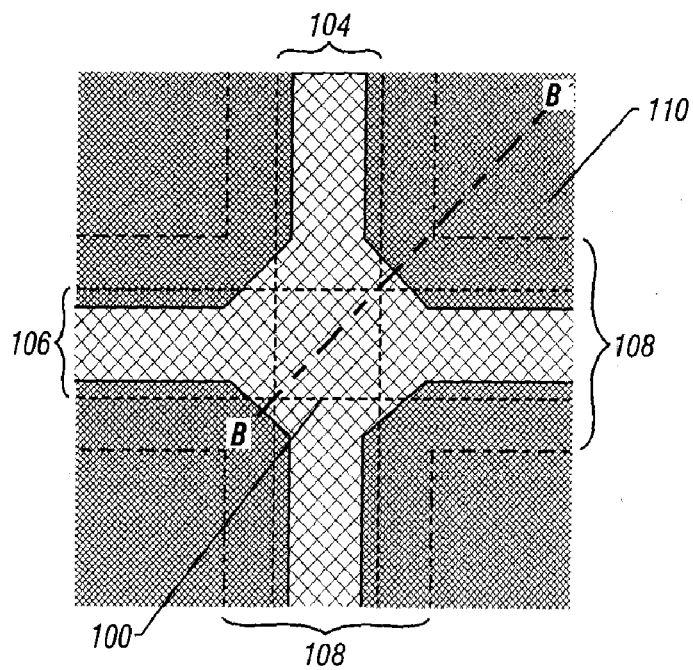

Like FIG. 1B, FIG. 6 is a top view as viewed from above the substrate showing an intersecting portion of a gate line 104 and a data line 106 and its vicinity. Therefore, FIG. 6 uses the same reference numerals as FIG. 1B.

With the shape of the patterning electrode 110 shown in FIG. 6, the patterning electrode 110 may be so formed as to be spaced from the intersecting portion 100 by a necessary patterning margin and to assume a corner shape similar to that of the intersecting portion 100.

As described above, the invention provides a liquid crystal display device which is free of the problems associated with the conventional devices, such as short-circuiting in an auxiliary capacitor or between wiring lines due to pressure that is exerted from a spacer, and hence can greatly improve the yield of a manufacturing process.

What is claimed is:

1. An electro-optical device comprising:
   an active matrix substrate comprising:
   a gate line formed on a substrate having an insulating surface;
   a first interlayer insulating film covering the gate line;
   a data line formed on the first interlayer insulating film so as to cross the gate line;
   a thin-film transistor formed in the vicinity of an intersecting portion of the gate line and the data line;
   a second interlayer insulating film;
   a pixel electrode being a transparent conductive film and formed over the gate line and the data line with the second interlayer insulating film interposed in between, the pixel electrode coextending with the gate line and the data line in areas other than an intersecting portion of the gate line and the data line with the interlayer insulating films interposed in between;
   a third interlayer insulating film covering the pixel electrode;
   a black matrix made of a conductive material and formed on the third interlayer insulating film;
   an opposed substrate having electrodes on a surface thereof; and
   spacers and a liquid crystal interposed between the active matrix substrate and the opposed substrate.

2. A device according to claim 1, wherein the black matrix and the pixel electrode form an auxiliary capacitor with the third interlayer insulating film in between.

3. A device according to claim 1, wherein a corner portion of the pixel electrode is intentionally cut out so as not to coextend with the intersecting portion when viewed from above.

4. A manufacturing method of an electro-optical device, comprising the steps of:
   forming gate lines made of a conductive material on a substrate having an insulating surface;
   forming a first interlayer insulating film so as to cover the gate lines;
   forming data lines on the first interlayer insulating film so that they cross the gate lines;
   forming a second interlayer insulating film so as to cover the gate lines and the data lines;
   forming transparent conductive films as pixel electrodes on the second interlayer insulating film so that the pixel electrodes coextend with the gate lines and the data lines in areas other than intersecting portions of the gate lines and the data lines with the interlayer insulating films interposed in between;
   forming a third interlayer insulating film so as to cover the pixel electrodes;
   forming a black matrix made of a conductive material on the third interlayer insulating film;
   inserting spacers and sealing a liquid crystal between the substrate and an opposed substrate having electrodes on a surface thereof; and
   forming thin-film transistors in the vicinity of the respective intersecting portions of the gate lines and the data lines that are arranged in matrix form.

5. A method according to claim 4, wherein the black matrix and the pixel electrodes form auxiliary capacitors with the third interlayer insulating film in between.

6. A method according to claim 4, wherein corner portions of the pixel electrodes are intentionally cut out so as not to coextend with the intersecting portions when viewed from above.

* * * * *

UNITED STATES PATENT AND TRADEMARK OFFICE
CERTIFICATE OF CORRECTION

PATENT NO.    : 6,320,636 B2
DATED         : November 20, 2001
INVENTOR(S)   : Takeshi Fukunaga and Hongyong Zhang It is certified that error appears in the above-identified patent and that said Letters Patent is hereby corrected as shown below:

Drawings,
Sheet 3 of 6, please replace FIGS. 3A and 3B with the attached FIGS. 3A and 3B.

Signed and Sealed this

Ninth Day of November, 2004

JON W. DUDAS
*Director of the United States Patent and Trademark Office*